(12) United States Patent
Shi et al.

(10) Patent No.: US 6,884,036 B2
(45) Date of Patent: Apr. 26, 2005

(54) COMPLEMENTARY COOLED TURBINE NOZZLE

(75) Inventors: Baolan Shi, Swampscott, MA (US); Robert Francis Manning, Newburyport, MA (US); Randall Brent Rydbeck, Hamilton, MA (US); Nigel Brian Thomas Langley, Danvers, MA (US)

(73) Assignee: General Electric Company, Schenectady, NY (US)

( * ) Notice: Subject to any disclaimer, the term of this patent is extended or adjusted under 35 U.S.C. 154(b) by 187 days.

(21) Appl. No.: 10/413,922

(22) Filed: Apr. 15, 2003

(65) Prior Publication Data

US 2004/0208744 A1 Oct. 21, 2004

(51) Int. Cl.⁷ ................................................. F01D 5/18
(52) U.S. Cl. .................................... 416/97 R; 415/115
(58) Field of Search ............................ 416/97 R, 96 R, 416/96 A; 415/115, 116, 173.7, 174.4, 174.5

(56) References Cited

U.S. PATENT DOCUMENTS

| | | | |
|---|---|---|---|
| 3,369,792 A | * | 2/1968 | Kraimer et al. ............. 415/115 |
| 4,180,373 A | | 12/1979 | Moore et al. |
| 4,416,585 A | | 11/1983 | Abdel-Messeh |
| 4,514,144 A | | 4/1985 | Lee |
| 4,616,976 A | | 10/1986 | Lings et al. |
| 5,232,343 A | | 8/1993 | Butts |
| 5,472,316 A | | 12/1995 | Taslim et al. |
| 5,720,431 A | | 2/1998 | Sellers et al. |
| 6,089,826 A | | 7/2000 | Tomita et al. |
| 6,132,169 A | | 10/2000 | Manning et al. |

FOREIGN PATENT DOCUMENTS

GB     2112467     7/1983

OTHER PUBLICATIONS

GE Aircraft Engines, "CF34–3B Stage 2 Nozzle," in commercial use in U.S.A. before Mar. 2002.

* cited by examiner

Primary Examiner—F. Daniel Lopez
Assistant Examiner—Kimya N. McCoy
(74) Attorney, Agent, or Firm—William S. Andes; Francis L. Conte

(57) ABSTRACT

A turbine nozzle includes outer and inner bands integrally joined to a vane having a three-pass serpentine flow circuit between opposite pressure and suction sidewalls. The outer band includes an inlet for channeling cooling air into a first channel of the circuit located behind a leading edge of the vane. A first outlet is disposed in the inner band at the bottom of the first channel where it joins the second channel of the circuit. A second outlet is also disposed in the inner band at the bottom of a third channel of the circuit which is disposed in flow communication with the second channel. The first channel behind the leading edge is smooth except for corresponding rows of first and second turbulators spaced laterally apart. The first turbulators bridge the pressure and suction sidewalls directly behind the leading edge, and the second turbulators are disposed behind the suction sidewall.

20 Claims, 4 Drawing Sheets

COMPLEMENTARY COOLED TURBINE NOZZLE

BACKGROUND OF THE INVENTION

The present invention relates generally to gas turbine engines, and, more specifically, to a turbine nozzle therein.

In a gas turbine engine, air is pressurized in a compressor and mixed with fuel in a combustor for generating hot combustion gases which flow downstream through corresponding turbines. A high pressure turbine (HPT) immediately follows the combustor and extracts energy from the combustion gases for powering the compressor. A low pressure turbine (LPT) follows the HPT for extracting additional energy from the combustion gases for producing output work such as powering an upstream fan in an aircraft turbofan engine application.

The turbines include a stationary or stator nozzle having a row of nozzle vanes which direct the combustion gases into a corresponding row of turbine rotor blades extending radially outwardly from a supporting rotor disk. The nozzle vanes and corresponding rotor blades cooperate for extracting energy from the gases for in turn rotating the supporting rotor disk, which in turn is joined by a corresponding shaft to either the compressor rotor or fan rotor for rotating the corresponding blades thereof.

These engine components define an annular flowpath extending downstream between the corresponding rows of nozzle vanes and rotor blades. Since the nozzle vanes are stationary and the rotor blades rotate during operation suitable seals are required therebetween for confining the combustion gases in the intended flowpath for maximizing engine efficiency.

Since the flowpath confines the hot combustion gases, the various components defining that flowpath must be suitably cooled during operation to ensure a suitably long useful life. Since the first stage turbine nozzle of the HPT receives the hottest combustion gases it must be specifically configured for enhanced cooling operation, typically using a portion of compressor discharge air for the cooling thereof. And, since the remaining turbine nozzles are disposed downstream from the first stage nozzle the combustion gases are cooler, and the cooling requirements of those turbine nozzles are lower.

An exemplary turbofan aircraft engine enjoying many years of public use in this country includes a second stage HPT nozzle with a relatively simple cooling circuit therein. This reference turbine nozzle includes hollow nozzle vanes with imperforate pressure and suction sidewalls and a row of drilled holes along the trailing edge thereof. A three-pass serpentine channel is provided inside each vane, with an inlet in the radially outer band above the leading edge which receives compressor discharge air for internal cooling of the vane. The first channel of the serpentine circuit extends behind the leading edge to the inner band, and extends radially outwardly therefrom in a second or mid-chord channel which extends to the outer band, and then turns radially inwardly into a third and final channel which extends back to the inner band. A first outlet is provided through the inner band at the flow turn between the first and second channels, and a second outlet is also provided in the inner band at the end of the third channel. These two outlets discharge the spent cooling air from each vane into a purge cavity between the first stage rotor disk and the second stage nozzle to ensure effective cooling of the components in this region.

Since any air bled from the compressor is not used in the combustion process, such air decreases the overall efficiency of the engine and must be minimized. However, the bled air is nevertheless required to ensure suitable cooling of the various turbine components which require cooling for enhanced life.

Accordingly, the competing requirements for compressor air is a major design objective in gas turbine engines for enhanced life thereof. Cooling air must be bled from the compressor for ensuring long life. However, the cooling air must nevertheless be minimized to minimize the reduction in engine efficiency.

Another design objective is backflow margin. The cooling air leaves the compressor with maximum pressure and must be suitably channeled through the various turbine components which correspondingly reduces its pressure prior to being reintroduced back into the combustion flowpath. Pressure losses must be minimized to ensure a suitable backflow margin of the cooling air with a pressure suitably greater than the pressure of the combustion gases to prevent ingestion of those combustion gases into the cooled turbine components from which the cooling air is discharged.

The reference second stage turbine nozzle described above has enjoyed many years of successful commercial use. The nozzle is the subject of a development program for further enhancing its durability and longevity. As part of this development program the profile of the nozzle vanes themselves has changed in the leading edge region, which has correspondingly increased the need for cooling thereof for meeting higher life objectives. A significant problem, however, is that increasing cooling effectiveness in the leading edge region will correspondingly increase the temperature of the spent cooling air and decrease its effectiveness for cooling the downstream portions of the vane, as well as the turbine rotor components cooled by the purge air discharged from the second stage nozzle.

The leading edge flow channel in the reference nozzle is smooth without heat transfer enhancing turbulators therein and avoids the pressure drop in cooling air associated with the turbulators for maintaining effective backflow margin. Turbulators are ubiquitous features in gas turbine engines found in various configurations and sizes in both turbine stator vanes and rotor blades. Although the primary objective of the turbulators is to increase heat transfer, and therefore increase cooling effectiveness of the limited cooling air bled from the compressor, turbulator performance varies from design to design, and between nozzle vanes or blades. Since turbine blades rotate during operation, the cooling air is subject to centrifugal forces which affects the heat transfer performance thereof, a phenomena not found in non-rotating nozzle vanes.

In a first stage turbine nozzle, performance of the turbulators must be maximized in view of the hottest combustion gases which bathe the nozzle vanes. Further cooling of the first stage nozzle vanes is typically also required, and is typically effected by introducing impingement baffles inside the nozzle vanes which first use the compressor discharge air in impingement cooling of the inner surfaces of the vane, prior to further cooling using turbulators therein.

However, second stage turbine nozzles are bathed in cooler combustion gases and may not require impingement baffles for their enhanced cooling capability, and may not require elaborate turbulator configurations for effective cooling. In fact, second stage nozzle vanes typically have imperforate pressure and suction sidewalls without the need for rows of film cooling holes often found in first stage nozzle vanes. The particular problem therefore in designing suitable second stage turbine nozzles is not maximizing cooling effectiveness with turbulators and impingement baffles, but balancing cooling of the various portions of the turbine nozzle while minimizing the amount of cooling air required therefor, and maintaining adequate backflow margin, and minimizing the rotor cooling air temperature.

Accordingly, it is desired to provide an improved second stage turbine nozzle for enhanced durability thereof.

BRIEF DESCRIPTION OF THE INVENTION

A turbine nozzle includes outer and inner bands integrally joined to a vane having a three-pass serpentine flow circuit between opposite pressure and suction sidewalls. The outer band includes an inlet for channeling cooling air into a first channel of the circuit located behind a leading edge of the vane. A first outlet is disposed in the inner band at the bottom of the first channel where it joins the second channel of the circuit. A second outlet is also disposed in the inner band at the bottom of a third channel of the circuit which is disposed in flow communication with the second channel. The first channel behind the leading edge is smooth except for corresponding rows of first and second turbulators spaced laterally apart. The first turbulators bridge the pressure and suction sidewalls directly behind the leading edge, and the second turbulators are disposed behind the suction sidewall.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DETAILED DESCRIPTION OF THE INVENTION

Figure 1:
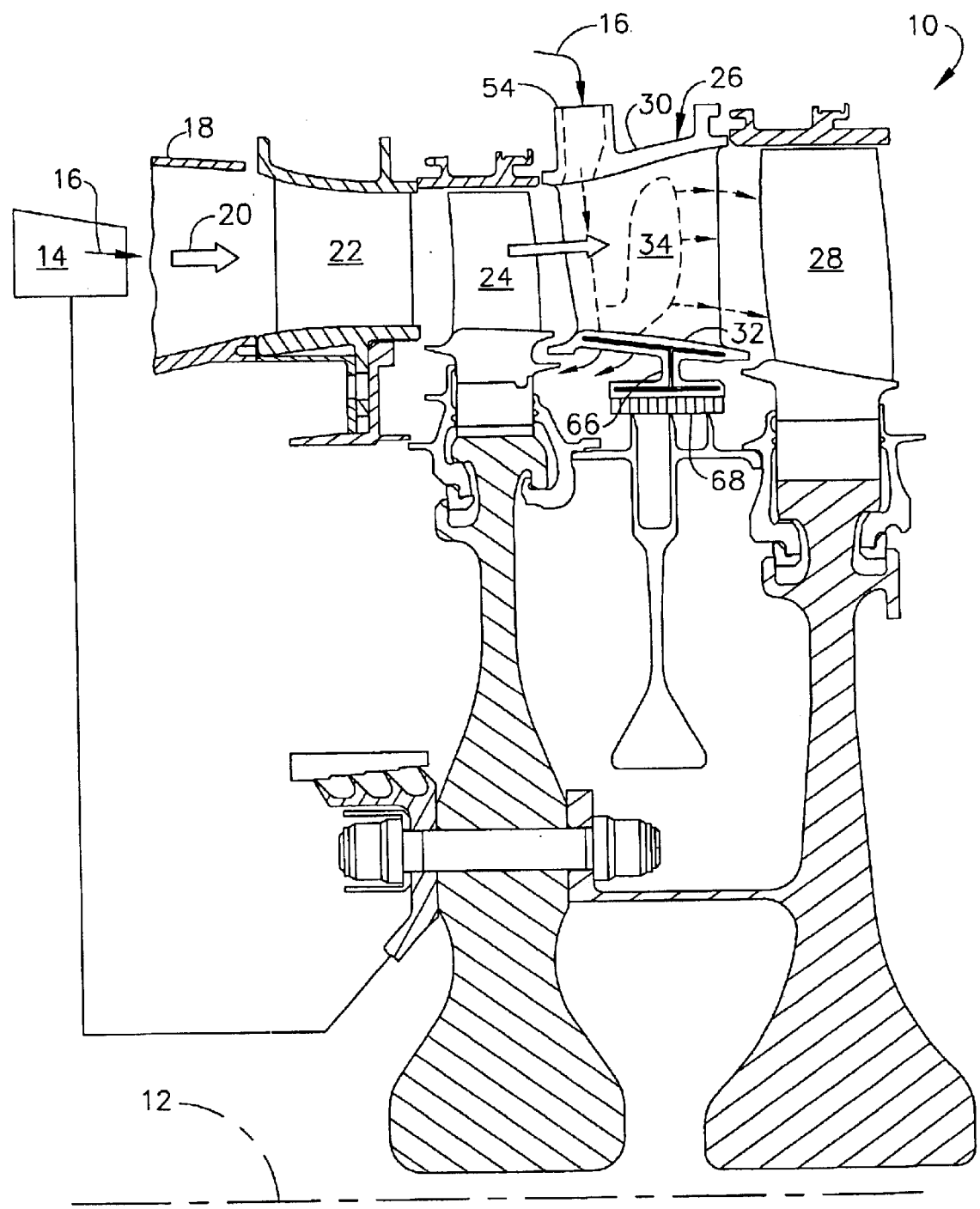
FIG. 1 is an axial sectional view of a portion of a turbofan aircraft gas turbine engine including a second stage turbine nozzle in accordance with an exemplary embodiment.

Illustrated in FIG. 1 is a portion of an exemplary turbofan aircraft gas turbine engine 10 which is axisymmetrical about a longitudinal or axial centerline axis 12. The engine includes a multistage axial compressor 14 which pressurizes air 16 during operation.

The pressurized air is discharged into an annular combustor 18, shown in aft part, wherein it is mixed with fuel and ignited for generating hot combustion gases 20. The combustion gases are discharged through a two-stage high pressure turbine which is suitably joined by a drive shaft to the compressor for rotating the compressor rotor blades thereof during operation.

The HPT includes a first stage turbine nozzle 22 followed in turn by first stage rotor blades 24, second stage turbine nozzle 26, and second stage turbine rotor blades 28. The rotor blades 24,28 extend radially outwardly from respective rotor disks which are integrally joined together to the common drive shaft which powers the compressor during operation.

The first stage, or high pressure, turbine nozzle 22 may have any conventional configuration and typically includes a row of hollow nozzle vanes mounted between corresponding outer and inner bands. The first stage nozzle typically includes impingement baffles in the vanes thereof, which vanes are typically covered with rows of film cooling holes (not shown).

The second stage turbine nozzle 26 similarly includes radially outer and inner bands 30,32 integrally joined or cast with a row of stator nozzle vanes 34 extending radially therebetween. Typically, two vanes are integrally formed with corresponding segments of the outer and inner bands in a unitary casting. And, the collective segments of bands and vanes are suitably supported to an outer casing by the outer bands specifically configured therefor in a conventional manner.

Figure 2:
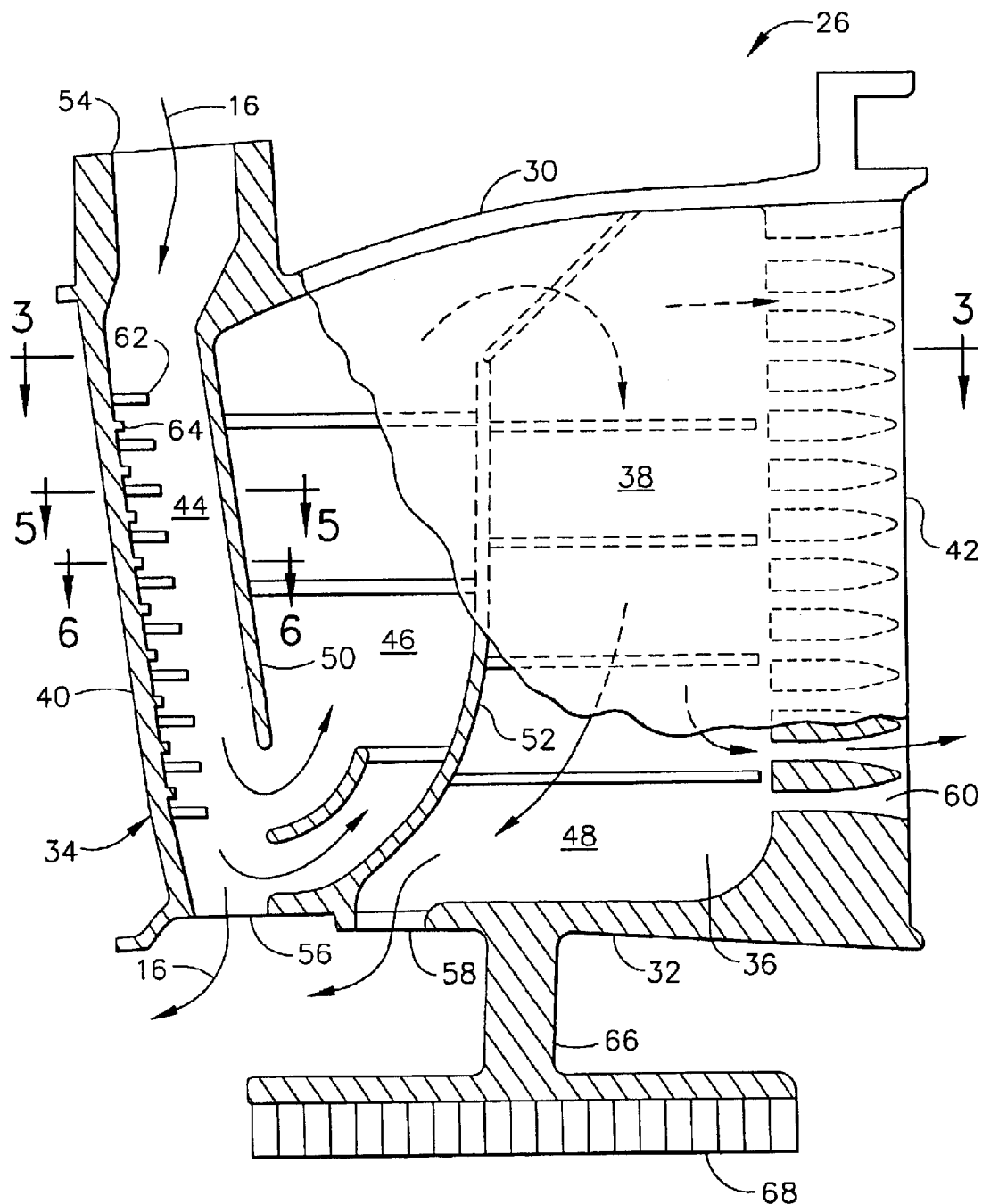
FIG. 2 is an enlarged, partly sectional axial view of an exemplary vane in the second stage turbine nozzle illustrated in FIG. 1.
Figure 3:
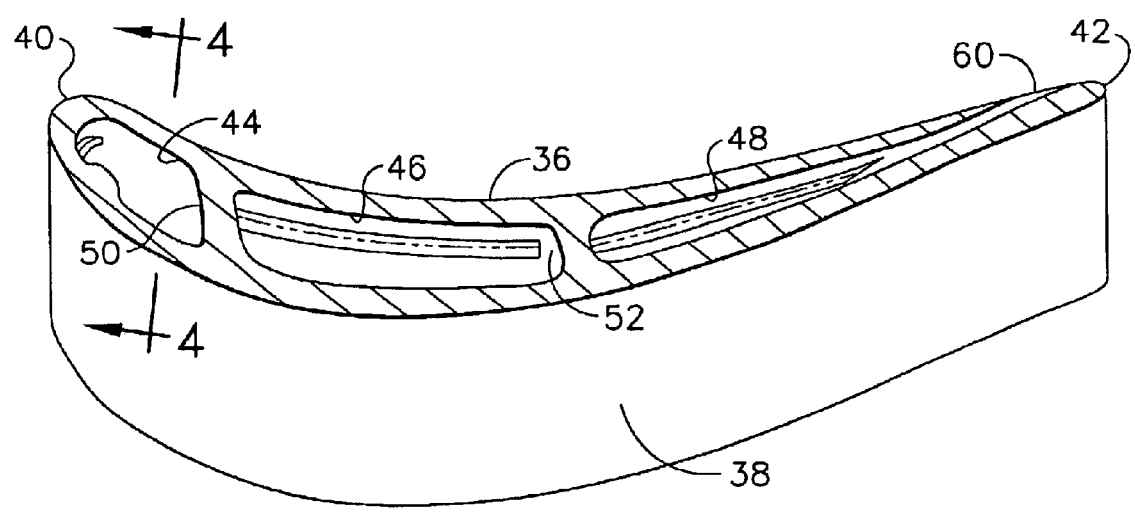
FIG. 3 is an axial isometric view of a portion of the nozzle vane illustrated in FIG. 2 and taken along line 3—3.

The second stage turbine nozzle 26 is illustrated in more detail in FIGS. 2 and 3 in accordance with a preferred embodiment. Each vane includes a generally concave pressure sidewall 36, and circumferentially opposite, generally convex suction sidewall 38. The two sidewalls are joined together at axially opposite leading and trailing edges 40,42 which extend radially or longitudinally between the outer and inner bands.

The two sidewalls are spaced apart circumferentially to define a three-pass serpentine flow circuit therebetween including in serial flow communication first, second, and third flow channels 44,46,48. The first, or leading edge, channel 44 is disposed immediately behind the leading edge between the two bands. The second, or mid-chord, channel 46 is disposed behind the first channel in flow communication therewith.

The second channel 46 is disposed behind and is separated in most part from the first channel by an imperforate forward bridge 50 which extends radially inwardly from the outer band and terminates short of the inner band. The third, or trailing edge, channel 48 is disposed behind the second channel in front of the trailing edge, and is separated in most part from the second channel by an imperforate aft bridge 52 which extends radially upwardly from the inner band and terminates short of the outer band. The distal ends of the forward and aft bridges permit crossover or turning bends between the first, second, and third channels for channeling the cooling air 16 in the serpentine flowpath defined thereby.

As shown in FIG. 2, the outer band 30 includes a single inlet 54 in the form of an aperture or port disposed at the top of the first channel 44 for receiving compressor discharge air 16 from the compressor illustrated in FIG. 1, and feeding that air into the nozzle vane. Correspondingly, the inner band 32 includes a first outlet 56 at the bottom of the first channel 44 for discharging a portion of the cooling air, and second outlet 58 at the bottom of the third channel 48 for discharging another portion of the cooling air from the nozzle vane.

As shown in FIGS. 2 and 3, each nozzle vane includes a row of trailing edge outlet holes 60 spaced apart longitudinally along the trailing edge 42 in flow communication with the third channel for discharging the remaining portion of the cooling air therefrom. The outlet hole 60 may have any suitable form such as the diverging apertures illustrated in FIG. 2 which terminate in the pressure sidewall adjacent the trailing edge.

As initially shown in FIG. 2, the first channel 44 is preferably smooth without protuberances, except for corresponding radial rows of first and second turbulators 62,64 extending outwardly from the inner.surface of the flow channel. The first turbulators 62 bridge the pressure and suction sidewalls directly behind the leading edge 40, generally opposite to the forward bridge 50. The row of second turbulators 64 is spaced laterally or circumferentially from the first row of turbulators 62 behind the suction sidewall 38, also generally opposite to the forward bridge 50.

But for the rows of first and second turbulators, both the pressure and suction sidewalls are otherwise devoid of any protuberances or turbulators. In this way, the first channel 44 disposed directly behind the leading edge is entirely smooth except for the preferentially located turbulators 62,64 behind the leading edge. This configuration in conjunction with the three-pass serpentine cooling circuit of the nozzle vane provides balancing of the cooling effectiveness of the limited cooling air 16 provided to the vane, while also maintaining a suitable backflow margin in the vane.

In order to introduce enhanced durability in the turbine nozzle illustrated in FIG. 2, the profile of the pressure and suction sidewalls has been changed over that described above in the Background section for the reference turbine nozzle. The new profile of the vane has increased the heat load in the leading edge region of the vane for an otherwise similar engine design. Since the flow rate and pressure of the cooling air 16 received at the nozzle vane inlet 54 are limited, enhanced use of that air is provided by the preferentially configured, sized, and located turbulators 62,64 in conjunction with the three-pass serpentine cooling circuit. The turbulators are configured for enhancing cooling in the local region of the vane leading edge without effecting either excess cooling or excess pressure drop therein which would degrade backflow margin and cooling effectiveness in the downstream portions of the serpentine circuit and rotor structure.

As shown in FIGS. 2 and 3, the pressure and suction sidewalls 36,38 of the nozzle vanes are imperforate except for the single row of trailing edge outlet holes 60 terminating near the trailing edge 42. The pressure and suction sidewalls do not include film cooling apertures therethrough as typically found in first stage turbine nozzles. And, therefore, all of the cooling air entering the vane inlet 54 is channeled inside the vane and discharged preferentially from the three corresponding outlets defined by the apertures 56,58, and 60.

The two outlets 56,58 are provided at the corresponding ends of the first and third flow channels to balance cooling of the vane as well as ensuring adequate cooling capability of the spent air 16 discharged from those outlets. As shown in FIGS. 1 and 2, the inner band 32 includes a generally T-shaped integral hanger 66 which extends radially below the third channel 48 for supporting a conventional honeycomb seal 68. The honeycomb seal 68 cooperates with labyrinth teeth extending from an interstage disk for maintaining the axial pressure drop between the upstream and downstream sides of the turbine nozzle 26.

As shown in FIG. 2, both outlets 56,58 in the inner band 32 are located between the vane leading edge 40 and the hanger 66 for discharging the spent cooling air 16 below the upstream side of the turbine nozzle near the first stage rotor disk supporting the first stage rotor blades. In this way, the spent air discharged from the nozzle vanes 34 provides a purging function between the first stage rotor and second stage nozzle for additionally cooling the components in this region.

Accordingly, the cooling air 16 which first enters each nozzle vane is used multiple times in turn in cooling the various portions thereof, as well as having reserved cooling capability for final use in the purge function forward of the supported hanger 66. However, this multiple use of the same cooling air requires careful balancing of the cooling effectiveness thereof and pressure drop in the flow along the cooling circuit, which features preferentially complement each other by the configuration of the newly introduced rows of turbulators 62,64.

Figure 4:
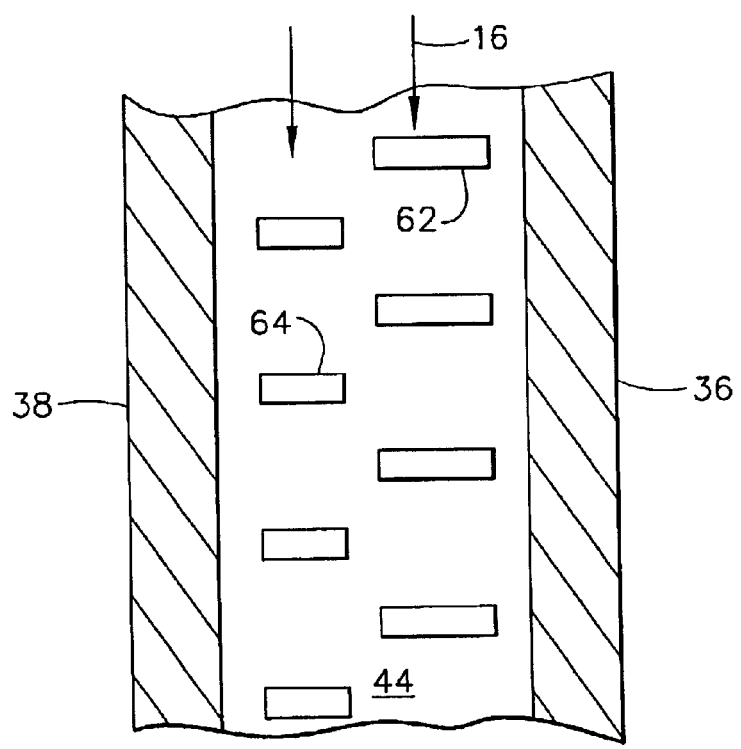
FIG. 4 is a partly sectional view of a portion of the leading edge flow channel shown in FIG. 3 and taken along line 4—4 illustrating two rows of turbulators therein in accordance with an exemplary embodiment.

More specifically, as shown in FIGS. 2 and 4, the first and second turbulators 62,64 are substantially parallel to each other in the first channel 44 and disposed substantially perpendicular to the radial direction of coolant flow. The first and second turbulators 62,64 are also staggered or spaced apart longitudinally or radially along the leading edge between the outer and inner bands.

Figure 5:
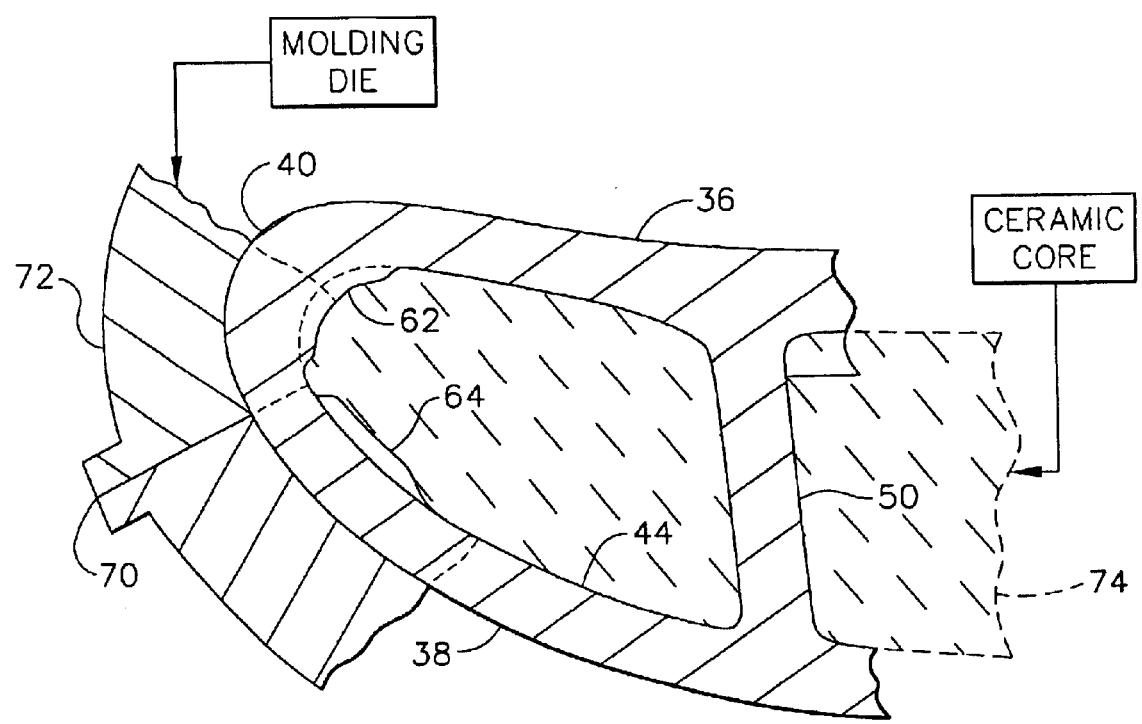
FIG. 5 is an enlarged radial sectional view of the leading edge portion of the nozzle vane illustrated in FIG. 2 and taken along line 5—5.
Figure 6:
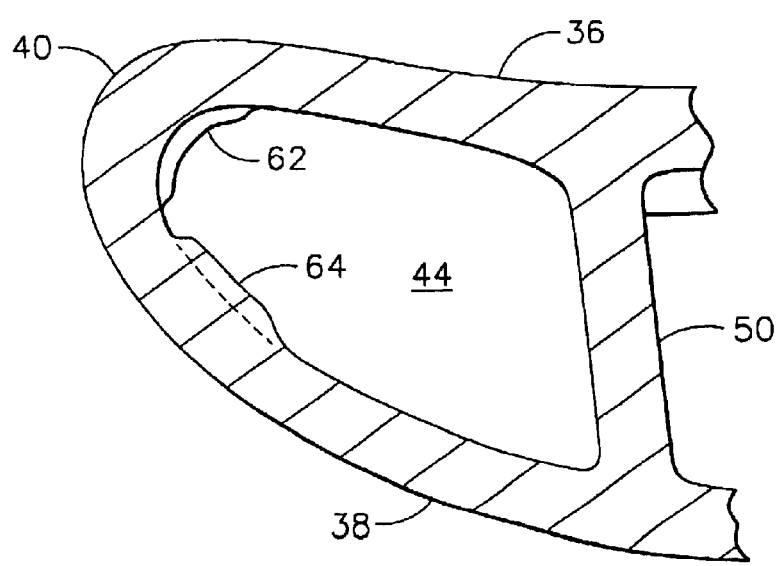
FIG. 6 is an enlarged radial sectional view of the leading edge portion of the nozzle vane illustrated in FIG. 2 and taken along line 6—6.

As shown in FIGS. 5 and 6, the first turbulators 62 bridge the pressure and suction sidewalls 36,38 substantially equally on opposite sides of the leading edge 40. The leading edge 40 is the line or locus of points which separates the pressure and suction sides during operation and defines a stagnation point at which the combustion gases split around the opposite sides of each vane. The first row of first turbulators 62 is preferentially located directly behind the leading edge 40 in the first channel for enhancing internal cooling of the vane in this region.

Since the leading edge 40 has a finite radius and the sidewalls have a generally uniform thickness, the inner surface behind the leading edge also has a finite, but smaller radius along which the first turbulators 62 are located. The first turbulators 62 are therefore arcuate to conform with the internal radius behind the leading edge, and the first turbulators 62 terminate in arcuate length at opposite ends thereof along the inner surfaces of the corresponding pressure and suction sidewalls.

Correspondingly, the suction sidewall 38, and its inner surface, have substantially less curvature than the leading edge itself, and the second turbulators 64 are substantially straight with little or no curvature as required to conform to the inner surface of the suction sidewall directly adjacent the row of first turbulators.

The first and second turbulators 62,64 illustrated in FIGS. 5 and 6 have a suitable height of about 10 mils (0.25 mm) with relatively short length of about four to five times the height thereof. Preferably, the lengths of the first and second turbulators are generally equal to each other, with the turbulators being spaced laterally apart to provide a narrow gap between the two rows thereof.

In this way, the two rows of turbulators occupy a relatively small surface area leaving most of the inner surface of the first flow channel completely smooth without obstruction. The two rows of turbulators 62,64 are decoupled from each other by the lateral spacing and longitudinal staggering for reducing the overall pressure drop attributable thereto. In this way, enhanced cooling in the limited region of the vane leading edge and adjoining suction sidewall is effected without introducing excessive pressure drop in the cooling air. The cooling air which first enters the inlet 54 may then effectively cool the leading edge region of the nozzle vane prior to being discharged through the second channel 46 and the first outlet 56.

As shown in FIG. 2, a portion of the cooling air from the first channel 44 is immediately discharged through the inner band below the first channel for providing relatively cool and high pressure cooling air upstream of the hanger 66 for purge cooling of the rotor cavity. And, the remaining portion of the spent air from the first channel then travels through the second and third channels of the serpentine circuit for providing cooling of these regions of the vane. The second and third serpentine channels 46,48 may have any conventional configuration and typically include full length turbulators along the pressure or suction sidewalls thereof as desired.

A portion of the spent cooling air from the third flow channel 48 is discharged through the row of trailing edge holes 60, with the remaining portion of the spent cooling air being discharged through the second outlet 58 in the inner band 32 for providing additional purge air upstream of the hanger 66 in the forward rotor cavity.

In a preferred embodiment, the first outlet 56, second outlet 58, and row of trailing edge outlet holes 60 are sized for discharging about a third each of the total flow received through the common inlet 54. Although the reference turbine nozzle disclosed above in the Background section is similarly configured for this one-third flow split in spent cooling air, the configuration illustrated in FIG. 2 maintains this desired flow split while introducing anew the two rows of turbulators 62,64 in the otherwise smooth leading edge channel 44. The preferentially configured turbulators 62,64 due to their limited size and location provide enhanced cooling while maintaining acceptable backflow margin, while also maintaining the complementary cooling performance of the various portions of the nozzle vane downstream from the leading edge channel, including the forward rotor cavity upstream of the hanger 66.

In the preferred embodiment illustrated in FIG. 2, the first row of turbulators is limited to or consists of ten first turbulators 62 spaced longitudinally apart behind the leading edge, and the second turbulator row is limited to or consists of nine second turbulators 64 staggered longitudinally between corresponding ones of the first turbulators. This limited number of strategically placed turbulators 62,64 in an otherwise smooth leading edge channel provides complementary performance of the entire nozzle vane and spent purge air therefrom for enhanced durability and life compared with the reference nozzle disclosed above in the Background section.

FIG. 5 illustrates schematically a preferred method of casting the nozzle vane. In this configuration, the row of first turbulators 62 adjoins the row of second turbulators 64 along the suction sidewall 38 at a split line 70 for a molding die 72 (shown in part) used for conventionally casting a ceramic core 74 corresponding with the desired serpentine flow circuit, including the turbulators therein. By separating the rows of turbulators 62,64 at the die split line 70, improved producibility in the casting process may be obtained.

The simple introduction of the first and second turbulators into the otherwise smooth leading edge channel provides complementary cooling of the various portions of the turbine nozzle while maintaining adequate backflow margin. Since the different portions of the turbine nozzle are inter-related by the common three-pass serpentine cooling circuit, the turbulators 62,64 are specifically configured for complementing overall cooling and backflow margin performance.

In contrast, the introduction of otherwise conventional patterns of turbulators in the leading edge channel could provide excessive cooling therein or excessive pressure loss which would degrade cooling performance of the downstream portions of the serpentine flow circuit.

Decoupling the rows of turbulators from each other and preferentially locating them behind the vane leading edge in the preferred embodiment provides enhanced cooling with suitable backflow margin, which in turn enhances the durability of the turbine nozzle. Additional durability improvements may also be introduced in the turbine nozzle by preferential design of the second and third flow channels and row of trailing edge outlet holes, but are not the subject of the present invention.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims in which we claim:

1. A second stage gas turbine nozzle comprising:
   outer and inner bands integrally joined to a vane therebetween;
   said vane including opposite pressure and suction sidewalls joined together at opposite leading and trailing edges;
   said sidewalls being spaced apart to define a three-pass serpentine flow circuit including a first channel extending behind said leading edge, a second channel separated in part from said first channel by an imperforate forward bridge extending from said outer band short of said inner band, and a third channel spaced in part from said second channel by an imperforate aft bridge extending from said inner band short of said outer band;
   said outer band including an inlet at said first channel for feeding pressurized cooling air thereto, said inner band including a first outlet at said first channel for discharging a portion of said air, and a second outlet at said third channel for discharging another portion of said air, and said vane including a row of outlet holes along said trailing edge in flow communication with said third channel for discharging remaining air therefrom; and
   said first channel being smooth except for a first row of first turbulators bridging said pressure and suction sidewalls directly behind said leading edge opposite said forward bridge, and a second row of second turbulators spaced laterally from said first row behind said suction sidewall, with said pressure sidewall being otherwise devoid of turbulators opposite said forward bridge.

2. A nozzle according to claim 1 wherein said first and second turbulators are parallel to each other, and staggered longitudinally along said leading edge between said outer and inner bands.

3. A nozzle according to claim 2 wherein said vane pressure and suction sidewalls are imperforate except for said trailing edge outlet holes.

4. A nozzle according to claim 3 wherein said first turbulators bridge said pressure and suction sidewalls substantially equally on opposite sides of said leading edge.

5. A nozzle according to claim 3 wherein said first turbulators are arcuate, and terminate in arcuate length at opposite ends on said pressure and suction sidewalls, and said second turbulators are substantially straight.

6. A nozzle according to claim 3 wherein said inner band includes an integral hanger extending below said third channel, and both said first and second outlets extend through said inner band between said leading edge and said hanger.

7. A nozzle according to claim 3 wherein said first turbulator row consists of ten first turbulators spaced apart longitudinally behind said leading edge, and said second turbulator row consists of nine second turbulators staggered longitudinally therebetween.

8. A nozzle according to claim 3 wherein said row of first turbulators adjoins said row of second turbulators along said suction sidewall at a split line for a molding die used for casting a ceramic core corresponding to said serpentine flow circuit.

9. A nozzle according to claim 3 wherein said first outlet, second outlet, and row of trailing edge outlet holes are sized for discharging about a third each of flow received through said inlet.

10. A nozzle according to claim 2 wherein said first and second turbulators have generally equal length.

11. A gas turbine nozzle comprising:

outer and inner bands integrally joined to a vane therebetween;

said vane including opposite pressure and suction sidewalls joined together at opposite leading and trailing edges;

said sidewalls being spaced apart to define a three-pass serpentine flow circuit including a first channel extending behind said leading edge, a second channel disposed behind said first channel, and a third channel disposed behind said second channel in front of said trailing edge;

said outer band including an inlet at said first channel for feeding pressurized cooling air thereto, said inner band including a first outlet at said first channel for discharging a portion of said air, and a second outlet at said third channel for discharging another portion of said air, and said vane including a row of outlet holes along said trailing edge in flow communication with said third channel for discharging remaining air therefrom; and said first channel being smooth except for a first row of first turbulators bridging said pressure and suction sidewalls directly behind said leading edge, and a second row of second turbulators spaced laterally from said first row behind said suction sidewall, with said pressure sidewall being otherwise devoid of turbulators.

12. A nozzle according to claim 11 wherein said vane pressure and suction sidewalls are imperforate except for said trailing edge outlet holes.

13. A nozzle according to claim 12 wherein said inner band includes an integral hanger extending below said third channel, and both said first and second outlets extend through said inner band between said leading edge and said hanger.

14. A nozzle according to claim 13 wherein said first and second turbulators are parallel to each other.

15. A nozzle according to claim 14 wherein said first and second turbulators are staggered longitudinally along said leading edge between said outer and inner bands.

16. A nozzle according to claim 15 wherein said first and second turbulators have generally equal length.

17. A nozzle according to claim 16 wherein said first turbulators bridge said pressure and suction sidewalls substantially equally on opposite sides of said leading edge.

18. A nozzle according to claim 17 wherein said first turbulators are arcuate, and terminate in arcuate length at opposite ends on said pressure and suction sidewalls, and said second turbulators are substantially straight.

19. A nozzle according to claim 15 wherein said row of first turbulators adjoins said row of second turbulators along said suction sidewall at a split line for a molding die used for casting a ceramic core corresponding to said serpentine flow circuit.

20. A nozzle according to claim 15 wherein said first outlet, second outlet, and row of trailing edge outlet holes are sized for discharging about a third each of flow received through said inlet.

* * * * *